United States Patent [19]

Rodgers

[11] Patent Number: 5,054,331

[45] Date of Patent: Oct. 8, 1991

[54] CONTROLLABLE GYROSCOPIC PROPULSION APPARATUS

[76] Inventor: Andrew T. Rodgers, P.O. Box 3426, West Columbia, S.C. 29171

[21] Appl. No.: 466,995

[22] Filed: Jan. 18, 1990

[51] Int. Cl.⁵ .................. F16H 27/04; F16H 23/08
[52] U.S. Cl. ............................ 74/84 R; 74/60; 74/87
[58] Field of Search ............... 74/84 R, 84 S, 60, 87, 74/61

[56] References Cited

U.S. PATENT DOCUMENTS

| | | | |
|---|---|---|---|
| 1,953,964 | 4/1934 | Laskowitz | 74/84 |
| 2,009,780 | 4/1934 | Laskowitz | 74/84 S X |
| 2,542,227 | 2/1951 | Bernhard | 74/61 |
| 3,555,915 | 1/1971 | Young, Jr. | 74/84 S X |
| 3,584,515 | 6/1971 | Matyas | 74/84 |
| 3,810,394 | 5/1974 | Novak | 74/84 X |
| 3,968,700 | 7/1976 | Cuff | 74/84 |
| 3,998,107 | 12/1976 | Cuff | 74/84 |
| 4,579,011 | 4/1986 | Dobos | 74/84 |
| 4,784,006 | 11/1988 | Kethley | 74/84 |
| 4,911,063 | 3/1990 | Kawahara et al. | 74/60 X |

FOREIGN PATENT DOCUMENTS

| | | | |
|---|---|---|---|
| 933483 | 4/1948 | France | 74/84 S |
| 7435395 | 5/1976 | France | 74/84 S |

Primary Examiner—Allan D. Herrmann
Assistant Examiner—Julie Krolikowski
Attorney, Agent, or Firm—Michael A. Mann

[57] ABSTRACT

A controllable gyroscopic propulsion apparatus comprising a base, a shaft rotatably mounted on the base, a cylindrical frame attached to the shaft and rotating therewith, a plurality of rods slidably and horizontally carried by the frame, weights attached by a pulley and cable system to the rods so that sliding the rods horizontally causes the weights to move radially, and a rotatable, tiltable plate for changing on command the horizontal positions of the rods so that the apparatus develops propulsion in the desired direction. The ends of the rods bear against the plate that can be rotated and tilted using a paid of cylinders. A motor may be attached to the base of the apparatus.

12 Claims, 3 Drawing Sheets

CONTROLLABLE GYROSCOPIC PROPULSION APPARATUS

BACKGROUND OF THE INVENTION

1. Field of the Invention

The present invention relates to a gyroscopic propulsion apparatus. In particular, the present invention relates to a controllable gyroscopic propulsion apparatus.

2. Discussion of Background

Apparatuses for producing gyroscopic propulsion are well known. See for example the apparatuses described in U.S. Pat. Nos. 4,784,006, 4,579,011, 3,998,107, 3,968,700, 3,810,394, 3,584,515, and 1,953,964. Each of these apparatuses has a rotating structure and a means for shifting weight from a position nearer the axis of rotation to a position farther from the axis of rotation causing the apparatus to move or vibrate. Although some of these apparatuses allow adjustments to the rate of movement, none of them are controllable in the sense that the rate of movement and direction can be selected and changed readily so that the apparatus can produce lateral movement on command.

Without a responsive control system, however, gyroscopic propulsion is of limited use. There is a need for a controllable gyroscopic propulsion apparatus.

SUMMARY OF THE INVENTION

In accordance with its major aspects, the present invention is an apparatus for converting rotary motion to linear motion. The apparatus comprises a base, a shaft rotatably mounted on the base, a plurality of weights in spaced relation to the shaft and rotating therewith, and a means for selectively displacing each of the weights radially outward from the shaft so that propulsion in the desired direction is obtained. The displacing means moves each of the weights radially and controls the radial movement so that each weight is moved to a desired radial distance. The desired distances of each weight are related, forming one set of many possible sets of related desired distances, each set producing movement in a particular direction. To move and control the weights, there is a cylindrical frame attached to the shaft, a plurality of rods slidably and horizontally carried by the cylindrical frame, and a means for attaching each one of the plurality of weights to one of the rods so that the weights move radially as the rods slide horizontally within the frame. One end of each rod engages a plate that surrounds the shaft. The plate can be rotated azimuthally and tilted with respect to the shaft to slide the rods longitudinally and thereby move the weights radially to the selected set of related desired distances. A motor for turning the shaft may be attached to the base.

A feature of the present invention is a rotatable, tiltable plate that increases lateral propulsion on command by pushing the ends of the rods into different configurations on command so that the weights generate propulsion in the lateral desired direction. This feature has the advantage of allowing an apparatus made according to the present invention to be maneuvered.

Another feature of the present invention is its weight system. The weight system allows different, heavier weights to be added easily for greater propulsion needs. Because the weights are compactly arranged, the shaft can be turned at relatively greater speed for smoother operation and to permit relatively greater changes in propulsion with relatively small changes in weight radius.

BRIEF DESCRIPTION OF THE DRAWINGS

In the Drawings:

FIG. 5 is a partial top plan view of a gyroscopic propulsion apparatus according to a preferred embodiment of the present invention showing the plate tilted and in the normal position;

DETAILED DESCRIPTION OF A PREFERRED EMBODIMENT

Figure 1:
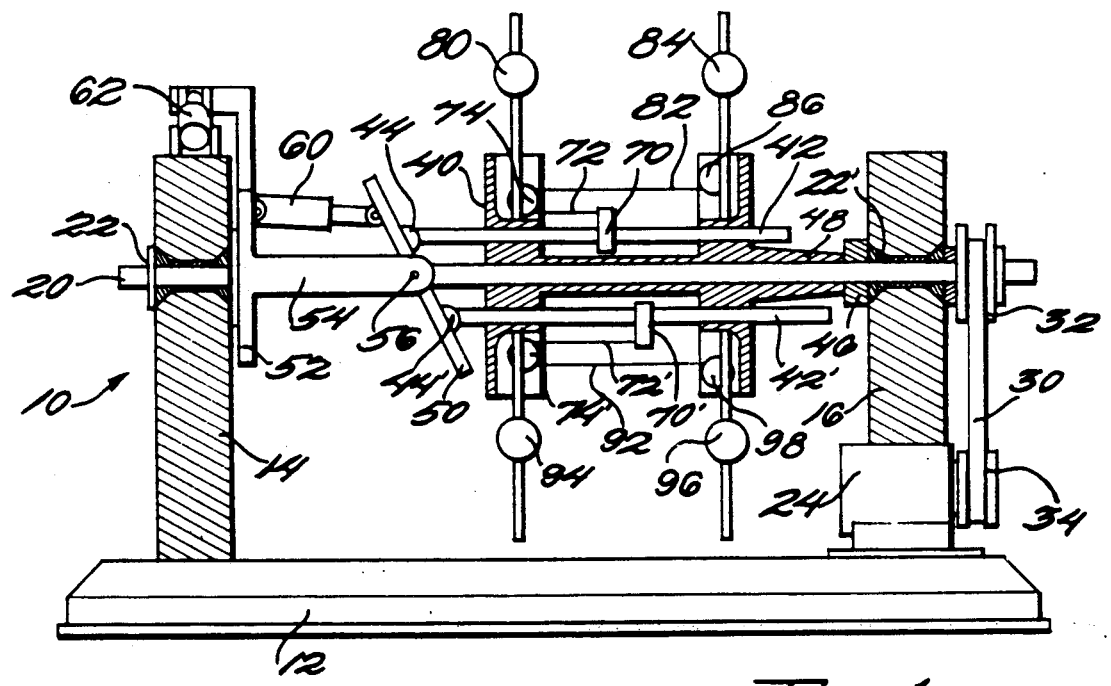
FIG. 1 is a partially cut away, side view of a gyroscopic propulsion apparatus according to a preferred embodiment of the present invention with the plate in the tilted position.
Figure 2:
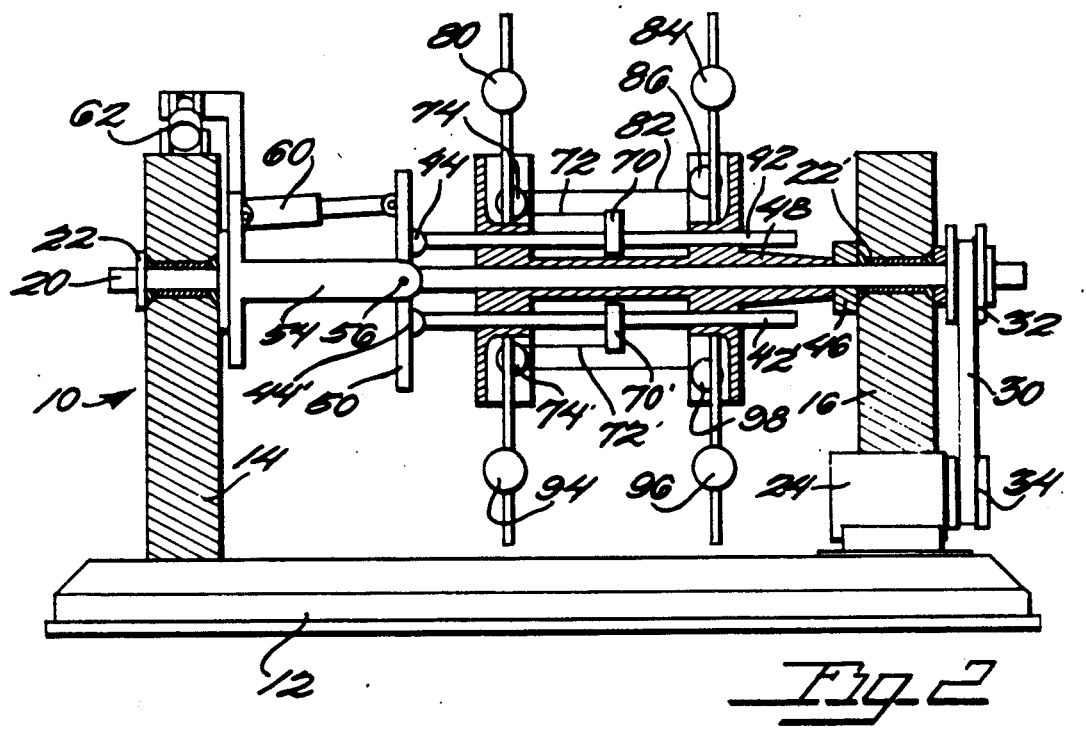
FIG. 2 is a partially cut away, side view of a gyroscopic propulsion apparatus according to a preferred embodiment of the present invention with the plate in the vertical position.

Referring now to FIGS. 1 and 2, a gyroscopic propulsion apparatus according to the present invention is generally indicated at 10. Apparatus 10 has a base comprising a horizontal support 12 and a left vertical support 14 and a right vertical support 16. Shaft 20 rotates in bearings 22, 22' in the left and right vertical supports 14, 16 of base 10, respectively, turned by a motor 24 attached to base 10. Bearings 22, 22' are preferably tapered on either side of left and right vertical supports 14, 16, acting against the forces of apparatus 10 when it operates. A heavy duty belt 30 and shaft pulley 32 connects the output pulley 34 of motor 24 with shaft 20. Drive belt 30 is preferably a link belt or other belt capable of high revolutions and potentially high torque. Motor 24 is shown as being an electric motor, but any motor capable of turning a shaft, and in particular an internal combustion engine, will work as well, the particular application of the apparatus determining the most suitable motor.

Attached to shaft 20 and rotating therewith is a cylindrical frame 40. Frame 40 carries a plurality of rods, FIGS. 1 and 2 showing two of four rods designated 42, 42'. Frame 40 may have any number of rods from a minimum of 3. Rods 42, 42' are carried horizontally in holes in frame 40 and slide easily. Rods 42, 42' each have a bearing end, 44, 44', respectively, that engages a tilt plate 50 which limits their horizontal movement and determines their positions relative to frame 40. Frame 40 bears against a bearing 46 attached to right vertical support 16. Frame 40 is preferably tapered at 48 to bear efficiently on bearing 46.

Tilt plate 50 is generally circular with a hole therein for shaft 20 to rotate therethrough. Tilt plate 50 is held stationary with respect to shaft 20 by an azimuthal plate 52 having two pivot arms 54 extending therefrom. Pivot pins 56 secure tilt plate but allow tilt plate 50 to tilt about an axis perpendicular to shaft 20. A first cylinder 60, attached at one end to azimuthal plate 52 and at the other end to tilt plate 50, tilts tilt plate 50 from a vertical position (FIG. 2) to a tilted position (FIG. 1). First cylinder 60 is shown attached to azimuthal plate 52 for clarity; however, it will be obvious that to minimize stresses, tilt plate 50 and azimuthal plate 52 should be closer together than shown. First cylinder 60 may be attached to left vertical support 14 and operate through a penetration in azimuthal plate 52. Such a penetration would have to be crescent shaped and sized so that azimuthal plate can turn through approximately 90 degrees without interfering with first cylinder 60.

Attached to left vertical support 14 is a second cylinder 62 which pushes on an extension 64 of azimuthal plate 52 to rotate azimuthal plate 52 azimuthally with respect to the axis of rotation of shaft 20. Rotating azimuthal plate 52 rotates tilt plate 50 through pivot arms 54. The bearing ends 44, 44' of rods 42, 42' are shifted by rotation of azimuthal plate 52 or tilt plate 50.

Attached rigidly to rods 42, 42' are clamps 70 and 70', respectively, which each hold the ends of a set of two cables each, two cables at 72, and two at 72'. Cables 72, 72' ride over double pulleys 74, 74', respectively. A first cable 76 (not visible in FIGS. 1 or 2) of cable set 72, is attached at the other end to weight 80; a second cable 82 of cable set 72 is attached at the other end to weight 84, cable 82 running over single pulley 86. Similarly, cable set 72' has a first cable 90 (not shown in FIGS. 1 or 2) and a second cable 92 leading to weights 94 and 96, respectively, with cable 92 running over single pulley 98 to weight 96. Alternative to the design shown, only one set of weights may be used, heavier weights substituted for lighter ones if the amount of weight must be maintained. Additional, smaller weights, although adding some complexity to the structure, minimize material stresses, however, and therefore the additional weights 84 and 96 are deemed preferable.

It will be seen by comparing FIGS. 1 to 2, that rod 42 is slid to the right when tilt plate 50 is moved from the tilted position (FIG. 1) to the vertical position (FIG. 2). Clamp 70, moving with rod 42, pulls cable set 72 to the left. Cable set 72, comprising cables 76 and 90 (not shown on FIGS. 1 or 2) pulls weights 80 and 84 radially inward.

Correspondingly, tilting tilt plate 50 to the vertical causes rod 42' to slide to the left, pulling clamp 70' to the left and allowing weights 94 and 96 to move radially outward, as shown in FIG. 2.

Figure 3:
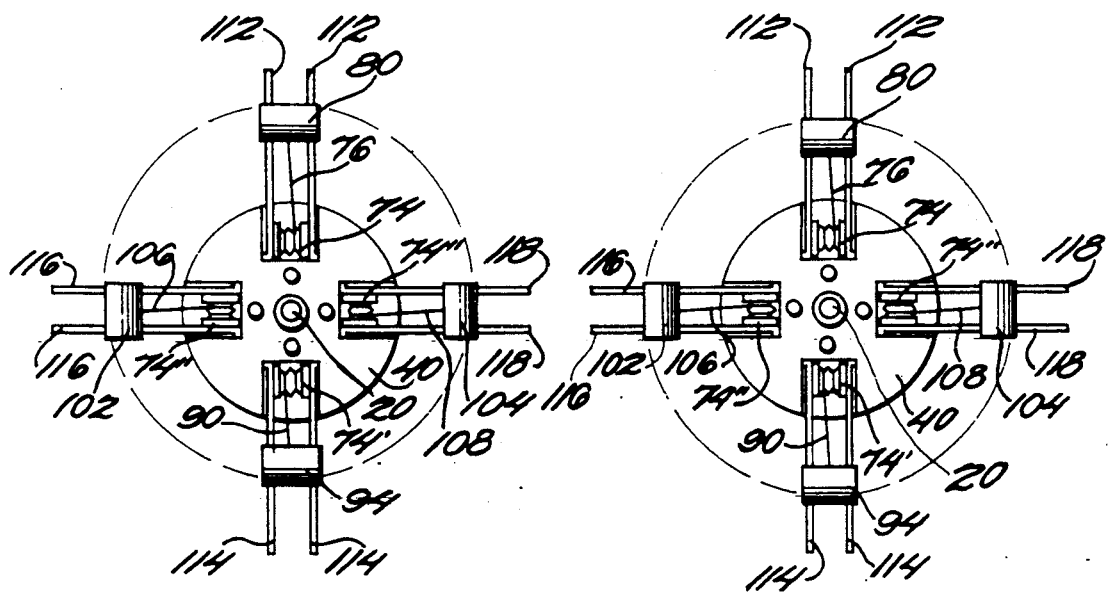
FIG. 3 is a partial cross sectional view of the gyroscopic propulsion device of FIG. 1 along lines 3—3 showing the weights biased in the upward position.

FIG. 3 shows a cross sectional view of FIG. 1 along lines 3—3 showing, shaft 20, frame 40, all four double pulleys, 74, 74', 74", and 74'", all four weights 80, 94, 102, and 104, and cables 76, 90, 106 and 108. Weights 74, 74', 74", 74'" slide radially inward and outward on rigid members 112, 114, 116, and 118, respectively. Note that weight 80, shown at the top of the rotating cycle in FIG. 3, is at that instant moved radially outward and weight 94 is moved radially inward. As shaft 20 rotates, each weight swings in turn to the top of the rotating cycle in sequence and moves radially outward as did weight 80. The range of movement of weights is confined between an outermost position and an innermost position.

Figure 4:
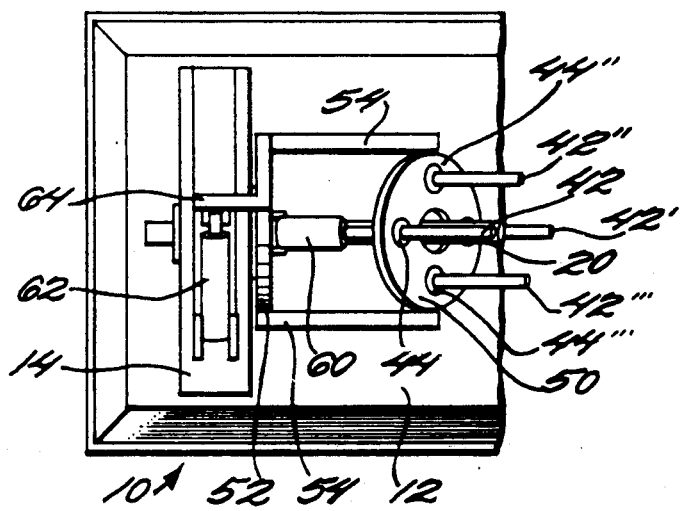
FIG. 4 is a partial cross sectional view of the gyroscopic propulsion device of FIG. 2 along lines 4—4 showing the weights in an unbiased position.

FIG. 4 shows a cross sectional view of FIG. 2 equivalent to that shown by FIG. 3 of FIG. 1. Here, however, all four weights 80, 94, 102, and 104 are at the same radial distance from the rotational axis of shaft 20. It will be evident that by tilting tilt plate 50 a little more or a little less that weights 80 and 94 at the top and the bottom of the rotating cycle, will be moved radially outward or inward. Furthermore, as azimuthal plate 52 is rotated from the normal position, weights 102 and 104 will be moved radially outward and inward to produce lateral propulsion corresponding to the direction of rotation of azimuthal plate 52. Each combination of positions of azimuthal plate 52 and tilting plate 50 places the bearing ends of rods 42, 42' in a distinct relative alignment engaging tilting plate 50 that, in turn corresponds to a set of relative positions of weights 80, 94, 102, 104. Each set of such positions corresponds to a direction of motion of apparatus 10.

FIG. 5 is a partial top plan view of apparatus 10 showing left vertical support 14, tilt plate 50, azimuthal plate 52, first cylinder 60 and second cylinder 62, and bearing ends 44, 44', 44" and 44'" of rods 42, 42', 42" and 42'", respectively. Tilt plate 50 is shown tilted back; azimuthal plate is shown in the normal position.

Figure 6:
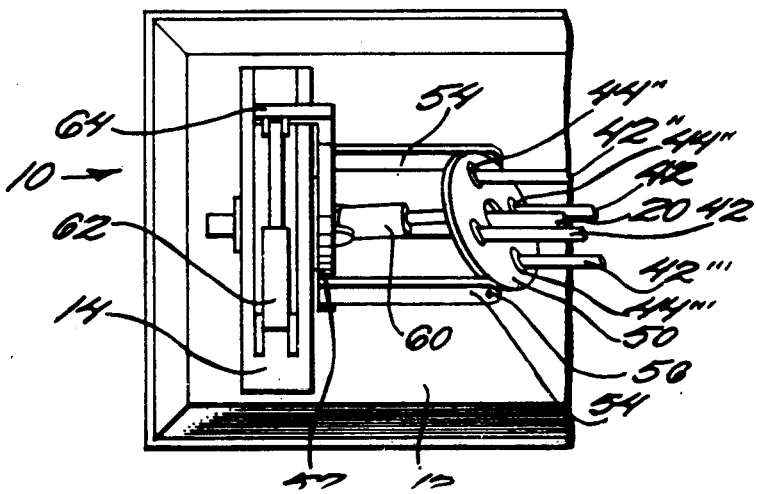
FIG. 6 is a partial top plan view of the gyroscopic propulsion apparatus showing said plate tilted and rotated to the left.

Comparing FIG. 6 to FIG. 5, which shows the same view of apparatus 10, second cylinder 62 has pushed extension 64 of azimuthal plate 52 to rotate azimuthal plate 52, and with it tilt plate 50, azimuthally with respect to the axis of shaft 20. Bearing ends 44, 44', 44" and 44'" then move to a new configuration set that will produce lateral movement.

Figure 7:
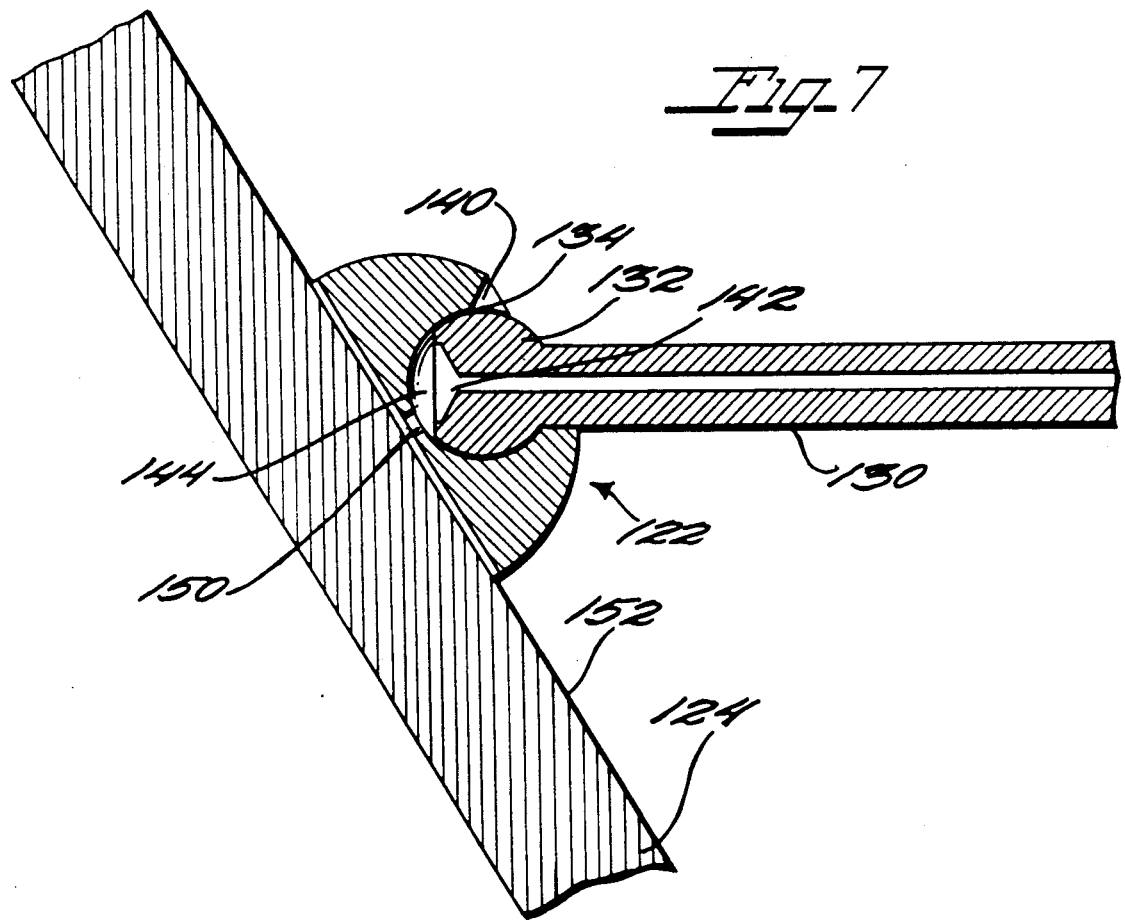
FIG. 7 is a detailed view of a rod bearing against the tilting plate according to a preferred embodiment of the present invention.

FIG. 7 shows a detail of a bearing end 122 on a tilt plate 124. A rod 130 requires a range of motion with respect to bearing end, the range depending on the amount of tilt that tilt plate 124 and azimuthal plate (not shown in FIG. 7) are capable of. Rod 130 terminates in a rounded end 132 fitting a rounded recess 134 in bearing end 122. The top of recess 134 is flared at 140 to permit the range of motion needed by rod 130.

Rod 130 is hollow to allow lubricating oil to flow to bearing surface, through a hole 142 in the end of rod 130 into a reservoir 144 where movement of rod 130 tends to pump oil through a hole 150 in bearing end 122 onto the surface 152 of tilt plate 124 so that bearing end rides on a film of oil.

Figure 8:
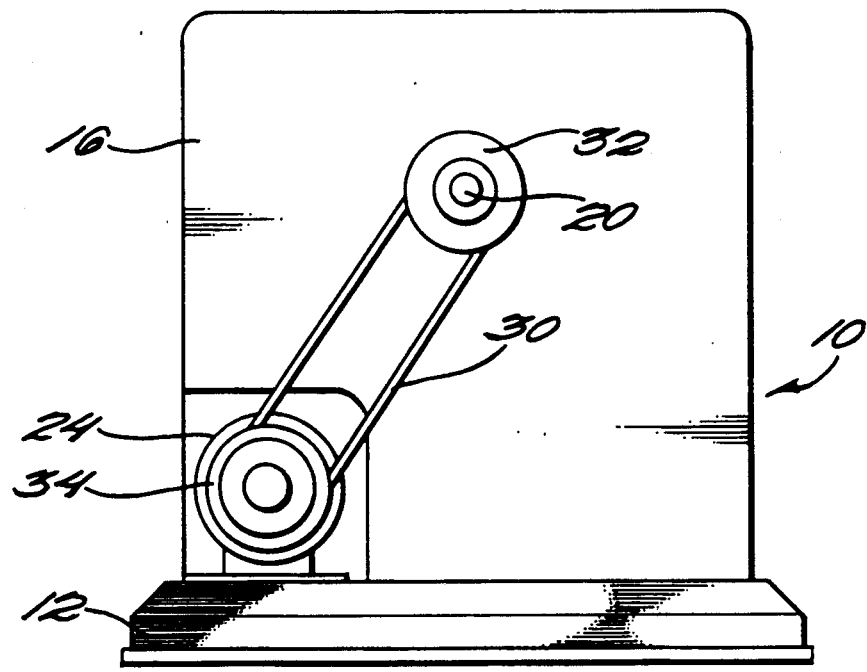
FIG. 8 is an end view of a gyroscopic propulsion apparatus according to a preferred embodiment of the present invention showing a motor connected to the shaft.

FIG. 8 shows right vertical support 16 of apparatus 10 where motor 24 is connected to shaft 20 by belt 30. Belt 30 is turned by output pulley 34 of motor 24 and shaft pulley 32 is turned by belt 30. Motor 24 is preferably located at a position on apparatus 24 where weights of the various components are balanced; therefore, motor 10 may be placed at either end of apparatus 10 or at a point between left and right vertical supports 14, and 16, respectively.

It will be apparent to those skilled in the art of gyroscopic propulsion that many changes may be made in the particular embodiment shown and described without departing from the spirit and scope of the invention, which is defined by the appended claims.

What is claimed is:

1. An apparatus for converting rotary motion to linear motion, said apparatus comprising:
   a base;
   a shaft rotatably mounted on said base, said shaft having a long axis;
   a cylindrical frame attached to said shaft and rotating therewith;

a plurality of rods slidably and horizontally carried by said cylindrical frame;

a plurality of weights connected to with said shaft and rotating therewith;

attaching means for attaching each one of said plurality of weights to one of said plurality of rods so that said weights move radially as said rods slide horizontally within said cylindrical frame; and controlling means for controlling said plurality of rods so that each of said weights is moved by one of said rods a desired distance between a first and a second position, each one of said desired distances relating to each other of said desired distances so as to form one set of a plurality of sets of related desired distances, each of said sets propelling said apparatus in one direction.

2. The apparatus as recited in claim 1, wherein each of said plurality of rods has a bearing end and said controlling means further comprises:

a plate surrounding said shaft, said bearing ends of said plurality of rods engaging said plate;

rotating means for rotating said plate azimuthally with respect to said shaft, said rotating means attached to said frame; and tilting means for tilting said plate, said tilting means attached to said base, said rotating and tilting means rotating and tilting said plate so that said rods, said bearing ends engaging said plate and sliding longitudinally, move said weights radially to said one set of said plurality of sets of related desired distances.

3. The apparatus as recited in claim 2, wherein said attaching means further comprises:

a pulley; and a cable running over said pulley, said cable having a first end and a second end, said first end attached to said one of said plurality of rods, said second end attached to said one of said plurality of weights.

4. The apparatus as recited in claim 2, further comprising a turning means for turning said shaft, said turning means attached to said base.

5. The apparatus as recited in claim 4, wherein said attaching means further comprises:

a pulley; and a cable running over said pulley, said cable having a first end and a second end, said first end attached to said one of said plurality of rods, said second end attached to said one of said plurality of weights.

6. The apparatus as recited in claim 1, further comprising a turning means for turning said shaft, said turning means attached to said base.

7. The apparatus as recited in claim 6, wherein said attaching means further comprises:

a pulley; and a cable running over said pulley, said cable having a first end and a second end, said first end attached to said one of said plurality of rods, said second end attached to said one of said plurality of weights.

8. The apparatus as recited in claim 1, wherein said attaching means further comprises:

a pulley; and a cable running over said pulley, said cable having a first end and a second end, said first end attached to said one of said plurality of rods, said second end attached to said one of said plurality of weights.

9. The apparatus as recited in claim 1, wherein each of said rods has a bearing end and said controlling means further comprises:

a tilting plate, said bearing ends of said rods engaging said plate; and rotating tilting means for rotating and tilting said tilting plate so that said rods are slid horizontally, said rotating and tilting means operatively connected to sid tilting plate.

10. The apparatus as recited in claim 9, wherein said rotating and tilting means further comprises:

an azimuthal plate attached to said base and said tilting plate;

a first cylinder having a first end and a second end, said first end attached to said azimuthal plate, said second end attached to said base;

a second cylinder having a first end and a second end, said first end of said second cylinder attached to said base, said second end attached to said azimuthal plate, said second end of said second cylinder attached to said azimuthal plate, said second cylinder adapted for rotating said tilting plate and said azimuthal plate with respect to said base.

11. The apparatus as recited in claim 1, wherein said attaching means further comprises:

a plurality of pulleys; and a plurality of cables, each cable running over one of said pulleys, said each cable having a first end and a second end, said first end attached to one of said plurality of rods, said second end attached to one of said plurality of weights.

12. The apparatus as recited in claim 9, wherein said attaching means further comprises:

a plurality of pulleys; and a plurality of cables, each cable running over one of said pulleys, said each cable having a first end and a second end, said first end attached to one of said plurality of rods, said second end attached to one of said plurality of weights.

* * * * *